US012304631B2

(12) United States Patent
Gil et al.

(10) Patent No.: US 12,304,631 B2
(45) Date of Patent: May 20, 2025

(54) PARCEL DELIVERY SYSTEM AND METHODS USING RAIL SYSTEM FOR UNMANNED AERIAL VEHICLES

(71) Applicant: United Parcel Service of America, Inc., Atlanta, GA (US)

(72) Inventors: Julio Gil, Veldhoven (NL); Ethan Prescott Hill, Lexington, KY (US); Jonathan Embry, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 898 days.

(21) Appl. No.: 17/313,196

(22) Filed: May 6, 2021

(65) Prior Publication Data
US 2022/0355929 A1  Nov. 10, 2022

(51) Int. Cl.
| | | |
|---|---|---|
| *B64D 1/22* | (2006.01) | |
| *B64C 17/02* | (2006.01) | |
| *B64U 101/64* | (2023.01) | |
| *B64U 101/67* | (2023.01) | |
| *B64U 101/69* | (2023.01) | |

(52) U.S. Cl.
CPC ............... *B64D 1/22* (2013.01); *B64C 17/02* (2013.01); *B64U 2101/64* (2023.01); *B64U 2101/67* (2023.01); *B64U 2101/69* (2023.01)

(58) Field of Classification Search
CPC ......... B64D 1/22; B64C 17/02; B64C 39/024; B64U 10/13; B64U 2101/60
USPC .......................................................... 410/2
See application file for complete search history.

(56) References Cited

U.S. PATENT DOCUMENTS

| | | | | |
|---|---|---|---|---|
| 2,268,009 A | * | 12/1941 | Babb ......................... | B64C 1/22 |
| | | | | 244/118.3 |
| 4,113,207 A | * | 9/1978 | Dalziel .................... | B64D 1/22 |
| | | | | 441/83 |
| 9,550,561 B1 | | 1/2017 | Beckman et al. | |

(Continued)

FOREIGN PATENT DOCUMENTS

| | | | | | |
|---|---|---|---|---|---|
| GB | | 2534123 A | * | 7/2016 | ............. A47F 10/06 |
| WO | WO-2016169035 A1 | * | 10/2016 | ............. B64D 47/08 |
| WO | WO-2022065587 A1 | * | 3/2022 | ........... B64C 39/024 |

OTHER PUBLICATIONS

International Search Report and Written Opinion received for PCT Patent Application No. PCT/US2022/024899, mailed on Jun. 30, 2022, 16 pages.

(Continued)

*Primary Examiner* — Hilary L Gutman
(74) *Attorney, Agent, or Firm* — Shook Hardy & Bacon L.L.P.

(57) ABSTRACT

A multiple hoist system is used with an unmanned aerial vehicle (UAV) for delivering parcels. An example of the multiple hoist system comprises two or more hoists that are independently operable, meaning that a first hoist can lower or raise a first line independently of using a second hoist to raise or lower a second line. The hoists can independently raise and lower their associated lines to allow the UAV to deliver multiple parcels to multiple delivery locations, or the hoists can synchronously raise and lower the associated lines together so that larger parcels can be delivered using the UAV. The hoists can be comprised within a body of the multiple hoist system. The body can further include a securing device for releasably securing the multiple hoist system to the UAV.

8 Claims, 12 Drawing Sheets

(56) References Cited

U.S. PATENT DOCUMENTS

| | | |
|---|---|---|
| 2018/0072420 A1* | 3/2018 | Prager ................. B64D 1/12 |
| 2018/0282130 A1* | 10/2018 | Kale ................. B66C 13/063 |
| 2019/0072954 A1 | 3/2019 | Taveira et al. |
| 2019/0235527 A1 | 8/2019 | O'Brien et al. |
| 2021/0253251 A1 | 8/2021 | Pass |
| 2024/0002043 A1* | 1/2024 | Hufenbach ........... B64U 10/13 |

OTHER PUBLICATIONS

International Preliminary Report on Patentability received for PCT Patent Application No. PCT/US2022/024899, mailed on Nov. 16, 2023, 13 pages.

\* cited by examiner

1

PARCEL DELIVERY SYSTEM AND METHODS USING RAIL SYSTEM FOR UNMANNED AERIAL VEHICLES

BACKGROUND

Delivering parcels using drones, in particular unmanned aerial vehicles (UAVs), is becoming a reality. Currently, there are some UAVs that deliver parcels by lowering the parcel downward from the UAV using a line or cable using, for example, a winch. Lowering parcels downward from an altitude of the UAV is beneficial because it allows the UAV to remain at a safe distance above a surface, so that it can avoid interaction with objects and people. This increases the safety of UAV delivery, and it allows UAV delivery to a greater number of locations, such as locations that would be difficult for a UAV to traverse if it were to deliver a parcel close to the surface.

As parcels are picked-up, delivered, or otherwise transferred to and from the UAV, the load conditions of the UAV may change. For example, after a parcel is delivered, the center-of-gravity of the UAV changes. This is especially true when the UAV is carrying multiple parcels having different destinations. The drawback, however, is that in current systems the UAV may be unable to adjust for the changed load conditions.

SUMMARY

At a high level, aspects described herein relate to a UAV having a parcel carrier coupled to a rail system through a drive system that allows the cargo of the UAV to be translated or moved relative to the UAV as needed or desired. This coupling system allows the location of cargo of the UAV to be adjusted relative to the UAV as parcels are picked up, or delivered by, the UAV.

In one aspect, the parcel delivery system is associated with an unmanned aerial vehicle. The parcel delivery system comprises at least a first parcel carrier adapted to transport at least a first cargo; a rail system coupling the first parcel carrier and the unmanned aerial vehicle; and a drive system coupled to the rail system and operable to translate the first parcel carrier on the rail system, moving the first parcel carrier along the rail system relative to the unmanned aerial vehicle, wherein the drive system is operable to move the first parcel carrier along the rail system to a desired position relative to the unmanned aerial vehicle. In other aspects, the parcel delivery system further comprises at least a second parcel carrier adapted to transport at least a second cargo, the rail system coupling the second parcel carrier to the unmanned aerial vehicle and the drive system operable to translate the second parcel carrier on the rail system, moving the second parcel carrier along the rail system relative to the unmanned aerial vehicle, wherein the drive system is operable to move the first parcel carrier and the second parcel carrier along the rail system to desired positions relative to the unmanned aerial vehicle. In some aspects, the first and second parcel carriers are winches that hold the first and second cargo, respectively, such as with a cable. In some aspects, the first parcel carrier moves independently from the second parcel carrier. In other aspects, the first parcel carrier moves with the second parcel carrier.

In another aspect, a method is disclosed for parcel delivery using an unmanned aerial vehicle, the method comprises: receiving a current load indication of the unmanned aerial vehicle in a first loaded condition; receiving a load change indication of the unmanned aerial vehicle in a second loaded condition; translating a loaded cargo of the unmanned aerial vehicle in the second loaded condition based on the load change indication.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
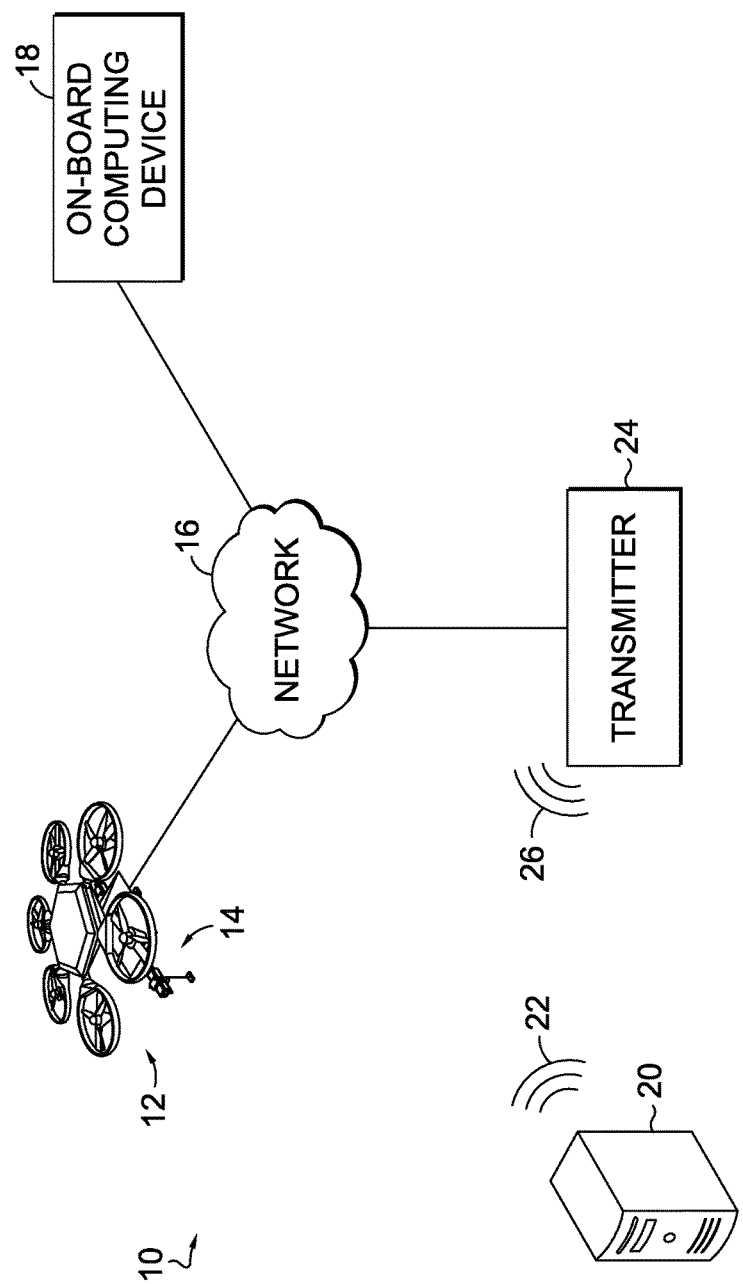
FIG. 1 is an example operating environment employing a UAV, in accordance with an aspect described herein.

FIG. 1 depicts a block diagram of example operating environment 10 for UAV delivery using a parcel delivery system. Illustrated in the example operating environment 10 is a UAV 12 having an associated parcel delivery system 14. The UAV 12 is in communication via a network 16 to an on-board computing device 18. It should be understood that operating environment 10 shown in FIG. 1 is an example of one suitable operating environment, and that other arrangements, including more or less components, are also suitable.

The UAV 12 can be any type of UAV. In general, a UAV includes any flight-capable vehicle that can be controlled remotely by a human pilot, operate autonomously based on a set of received or determined instructions, or a combination of both. UAVs may include vertical take-off and landing (VTOL) aircraft, which are aircraft that can hover, take off, or land vertically or near vertically. Examples of these include single-rotor VTOL aircraft, such as helicopters, or multi-rotor VTOL aircraft. UAV is also intended to include conventional take-off and landing (CTOL) aircraft. CTOL aircraft generally take off and land over a distance. Many CTOLs include fixed-wing aircraft that use an airfoil for forward flight advantages. UAV is also intended to include aircraft using a combination of rotor(s) and a fixed wing. Thus, while the UAV 12 is illustrated as a multi-rotor VTOL aircraft, in practice, it may be any type of UAV, including a fixed-wing CTOL aircraft.

As illustrated, the parcel delivery system 14 is coupled to the UAV 12. In some aspects, the parcel delivery system 14 is releasably coupled to the UAV 12. With continued reference to FIG. 1, the UAV 12 communicates via the network 16 to the on-board computing device 18. The network 16 encompasses any form of wired or wireless communication. Wireless communication examples include one or more networks, such as a public network or virtual private network "VPN." The network 16 may include one or more local area networks (LANs) wide area networks (WANs), or any other communication network or method. In addition to Wi-Fi, other wireless examples include Bluetooth and infrared communication methods.

The UAV 12, in some aspects, includes the on-board computing device 18. In some aspects, the on-board computing device 18 includes a flight controller. Various flight controllers are available for use with the UAV 12. One of ordinary skill in the art will have an understanding of the availability and benefits of such flight controllers. Though represented as a single component, the on-board computing device 18 can be distributed in nature. That is, one or more functions may be performed by a single component or by a plurality of components distributed throughout the UAV 12. The on-board computing device 18 generally includes a processor that executes instructions stored on computer memory. An example includes computing device 300 of FIG. 11.

The on-board computing device 18 may receive instructions from a remote server 20. To do so, the on-board computing device 18 can be in communication with a receiver (not illustrated) to receive a signal 22 from the remote server 20. The on-board computing device 18 may also communicate to the remote server 20 using a transmitter 24 that sends a signal 26.

In general, receivers and transmitters comprise any system known in the art for sending and receiving communication signals, such as those represented by the signal 22 and the signal 26. Examples may include receivers and transmitters that send and receive signals across a frequency band of the electromagnetic spectrum. Some suitable short-distance transmitter-receiver pairs are configured for use with 900 MHz, 2.4 GHz, and 5.8 GHz communication bands. Some over-the-horizon (OTH) transmitter-receiver pairs utilize telecommunications bands, such as those supporting LTE, 4G, and 5G bands. Other example transmitter-receiver pairs use frequency bands associated with satellite communications. These are just examples, and other suitable communication methods may be used and are contemplated to be within the scope of this disclosure.

With reference to FIG. 1, it should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory as further described with reference to FIG. 11.

Figure 2A:
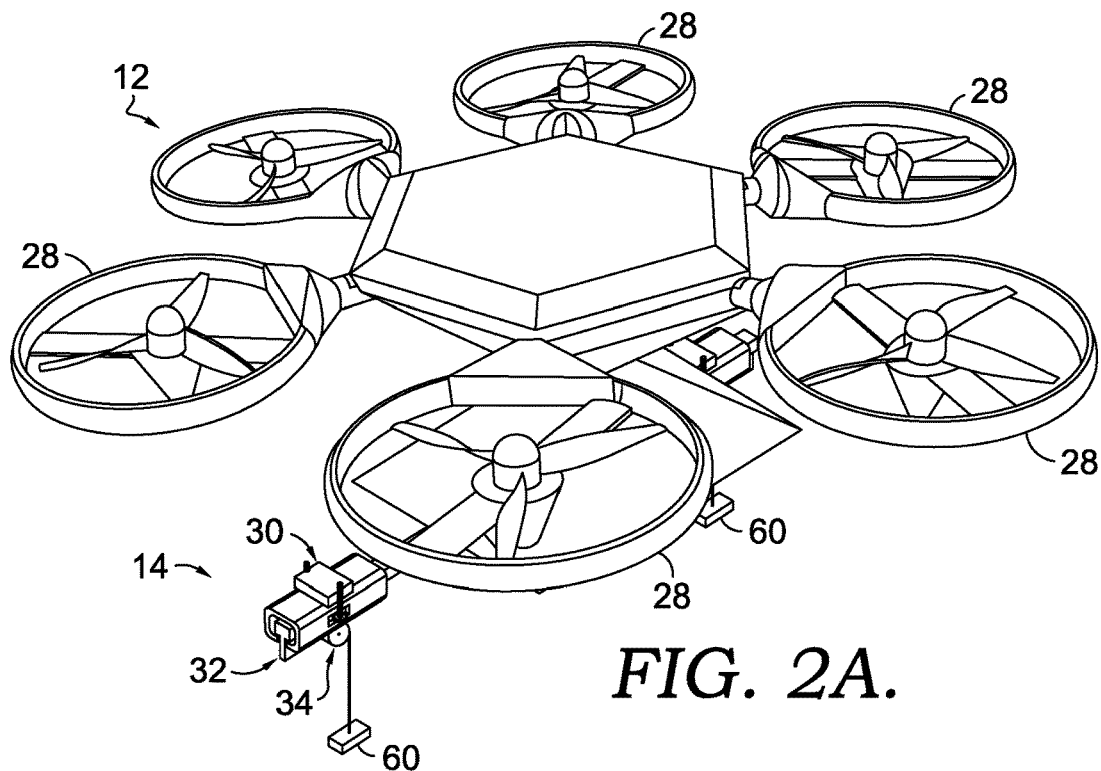
FIG. 2A is a perspective view of parcel delivery system associated with a UAV, in accordance with an aspect described herein.
Figure 2B:
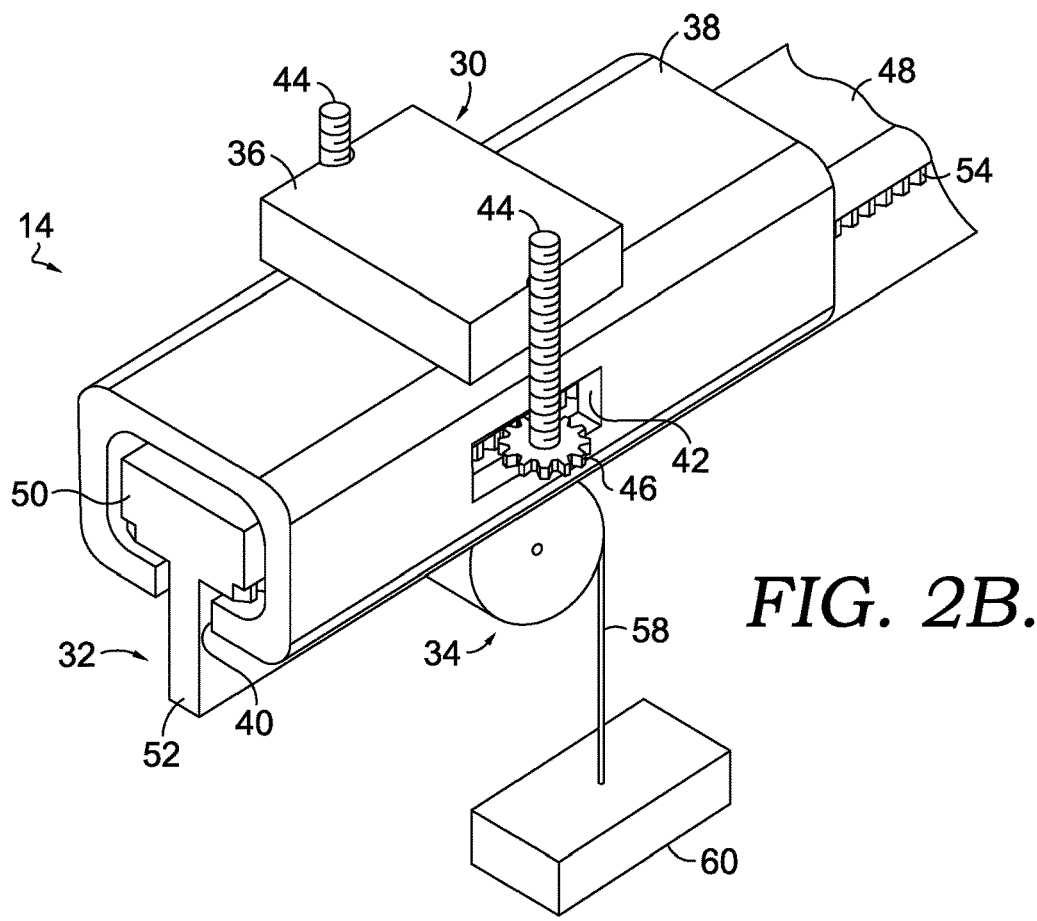
FIG. 2B is an enlarged partial view of aspects of FIG. 2A, in accordance with an aspect described herein.
Figure 2C:
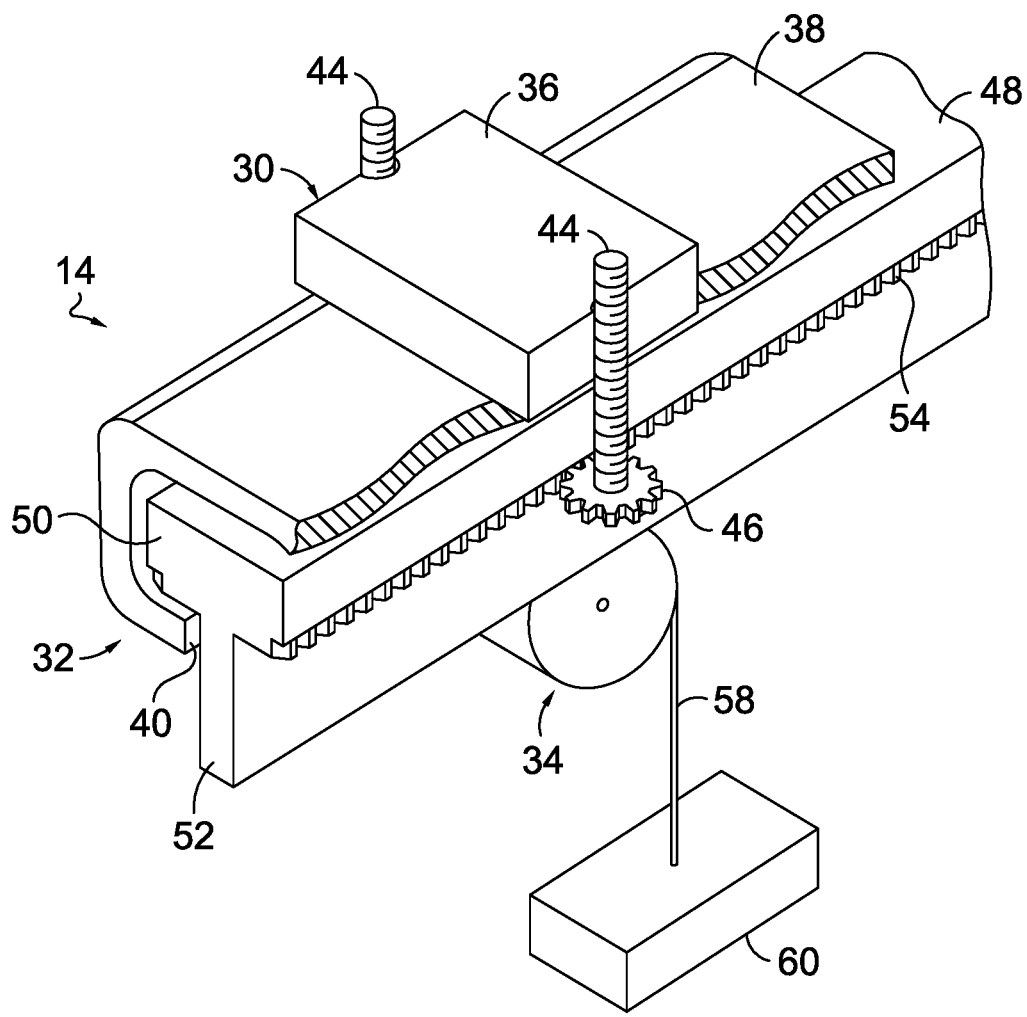
FIG. 2C is a view similar to FIG. 2B, but with parts being broken away to show details of construction, in accordance with an aspect described herein.

Turning now to FIG. 2A, a perspective view of the UAV 12 is shown with one aspect of the parcel delivery system 14 attached. As illustrated, the UAV 12 may have multiple propellers 28 that are operable to maneuver the UAV 12. FIGS. 2A-2C show one aspect of the parcel delivery system 14, with a drive system 30 coupled to a rail system 32. The rail system 32 is also coupled to a parcel carrier 34 that is adapted to transport a cargo 60. As best seen in FIGS. 2A and 2B, in some aspects, the drive system 30 includes a motor 36 coupled to a portion of the UAV 12. In some aspects, the motor 36 is also coupled to a portion of the rail system 32, such as through a central rail 38. The rail 38 of the rail system 32 forms an outer wall with an elongated slot 40 along the bottom of the rail 38. In some aspects, the rail 38 is formed from a lightweight, sturdy material, such as aluminum. The rail 38 also has a pair of side openings 42 (only one of which is shown in FIG. 2B, it being understood that a side opening 42 is also formed on the side of the rail 38 that is not shown). The side openings 42 provide access to the interior of the rail 38. In some aspects, the motor 36 is operably coupled to a pair of worm gears 44. The motor 36 is operable to rotate the worm gears 44. Each worm gear 44 has another gear 46 coupled to its lower end. The gear 46 extends through a corresponding side opening 42, and as the motor 36 rotates the worm gear 44, the gear 46 is correspondingly rotated. In other aspects, the worm gear 44 could also be a hypoid gear, a helical gear, or other bevel gear system that translates rotation in the motor to rotation the gear 44.

The rail system 32 includes the rail 38 and a mounting bar 48. As best seen in FIG. 2C, the mounting bar 48 has an upper portion 50 that is supported within the rail 38 and has a lower portion 52 that extends below the rail 38 and through the slot 40. As best seen in FIG. 2C, in some aspects, the upper portion 50 of the mounting bar 48 has a toothed rack 54 formed thereon. The teeth of the gear 46 engage the teeth of the toothed rack 54. While not shown, in some aspects, the parcel delivery system 14 of FIGS. 2A-2C includes an arrangement of the worm gear 44, gear 46, side opening 42 and toothed rack 54 on the side that is hidden from view. As the drive system 30 is engaged, the motor 36 rotates the worm gears 44 and the gears 46. As the gears 46 are rotated, they engage the teeth of the toothed rack 54. Rotation of the worm gears 44 in a first direction will thus move the mounting bar 48 within the rail 38 in a first direction relative to the UAV 12. Similarly, rotation of the worm gears 44 in the opposite direction will move the mounting bar 48 within the rail 38 in a second (opposite) direction relative to the UAV 12.

The parcel delivery system 14 of FIGS. 2A-2C also includes the parcel carrier 34 that is coupled to the lower portion 52 of the mounting bar 48. In some aspects, the parcel carrier 34 is a winch that spools and unspools a tether or cable 58 that is releasably coupled to the cargo 60. The cargo 60 may be a single parcel, or may be a container adapted to carry a plurality of parcels. The parcel carrier 34, being coupled to the mounting bar 48, can be translated relative to the UAV 12 through operation of the drive system 30. In some aspects, the drive system 30 is operable to position the parcel carrier 34 relative to the UAV 12, such as might be desired to center the parcel carrier 34, or otherwise position the parcel carrier 34 for efficient operation of the UAV 12, as is further described below.

Figure 3:
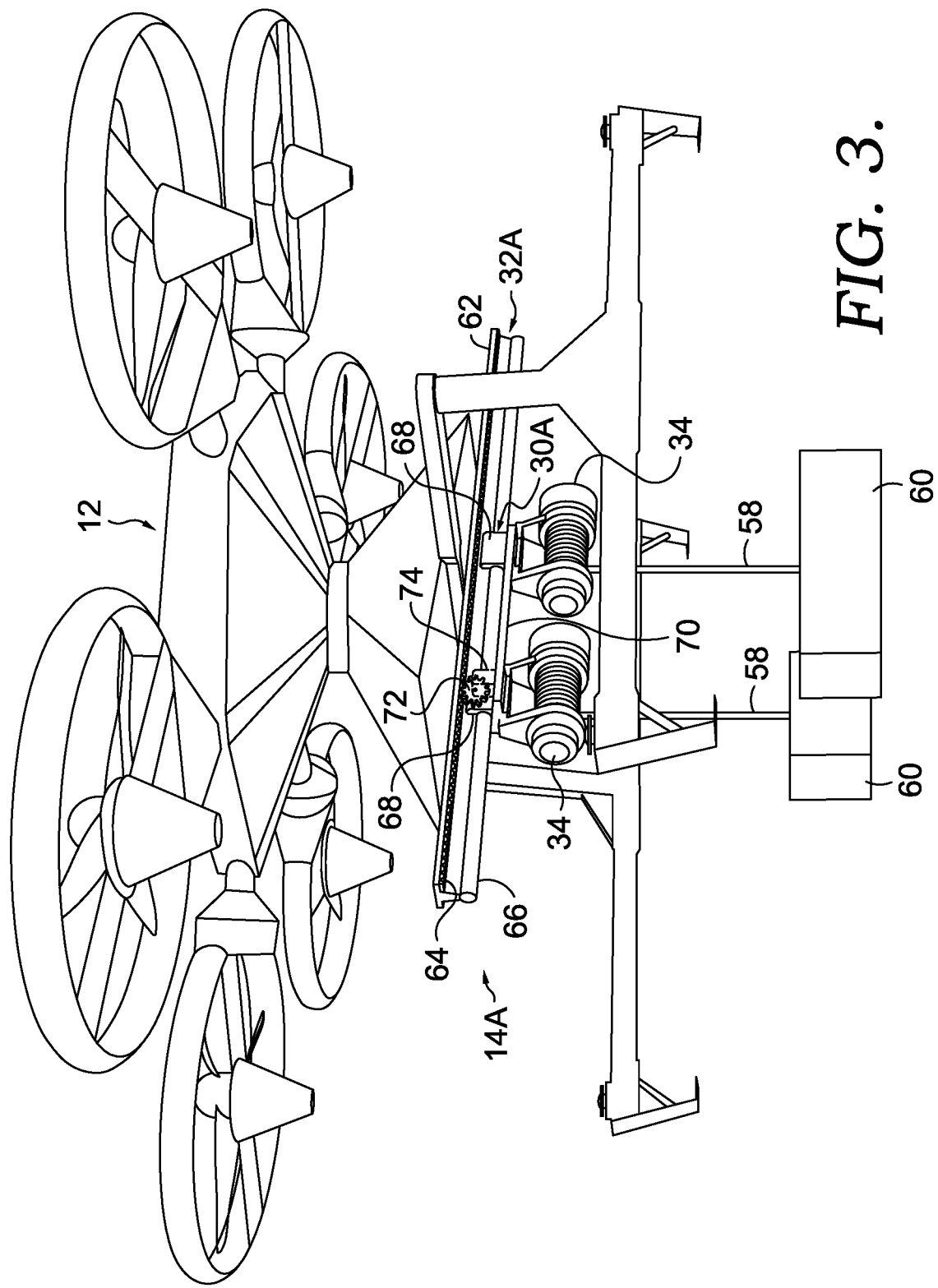
FIG. 3 is a perspective view of a parcel delivery system associated with a UAV, in accordance with another aspect described herein.

Another aspect of the parcel delivery system 14A is shown in FIG. 3, shown coupled to the UAV 12. The parcel delivery system 14A shown in FIG. 3 has a drive system 30A coupled to a rail system 32A. The rail system 32A is also coupled to two parcel carriers 34. Each parcel carrier 34 is adapted to transport a cargo 60 and may spool and unspool a cable 58 as described above with respect to FIGS. 2A-2C.

The rail system 32A includes a rail 62 that, in some aspects, has a general T-shape. The rail 62 may be directly coupled to the underside of the UAV 12 with any of a number of coupling mechanisms to securely affix the rail 62 to the UAV 12. In some aspects, at least one portion of the rail includes an elongated, toothed rack 64. A cylindrical rod 66 may be fixedly coupled to the bottom of the rail 62, such as by welding. In other aspects, the rod 66 may be integrally formed with the rail 62. In some aspects, the rod 66 and the rail 62 are extruded to the shape and form as shown. As shown in FIG. 3, the rail system 32A also includes a pair of collars 68 that have a cylindrical bore that mates with the rod 66, such that the collars 68 are supported on the rod 66 and are allowed to slide or translate along the rod 66. In some aspects, the inner surface of the collars 68 incorporate ball bearings or are coated with a layer of low-friction plastic, to facilitate sliding along the rod 66. The collars 68 are coupled to a platform 70 that couples the two collars 68 together. While two collars 68 are shown, one elongated collar 68 could also be used, in some aspects.

The drive system 30A of the parcel delivery system 14A includes the toothed rack 64 on the rail 62. The drive system 30A also includes at least one gear 72 powered by a motor 74. In some aspects, the motor 74 is coupled to, and supported by, the platform 70. In FIG. 3, the motor 74 is shown in hidden lines to allow a view of the gear 72.

The parcel delivery system 14A is shown with two parcel carriers 34 that are coupled to the platform 70. Each parcel carrier 34 may transport a cargo 60. As the motor 74 powers and rotates the gear 72, the gear 72 engages the teeth of the rack 64. As the gear 72 rotates in a first direction, the platform 70, the parcel carriers 34 and the respective cargo 60 can be translated in a first direction relative to the UAV 12. As the gear 72 rotates in a second direction, the platform 70, the parcel carriers 34 and the respective cargo 60 can be translated in a second direction relative to the UAV 12. In some aspects, the drive system 30A is operable to position the parcel carriers 34 relative to the UAV 12, such as might be desired to center the parcel carriers 34, or otherwise position the parcel carriers 34 for efficient operation of the UAV 12, and may be controlled, in some aspects, by the on-board computing device 18 on the UAV 12.

Figure 4:
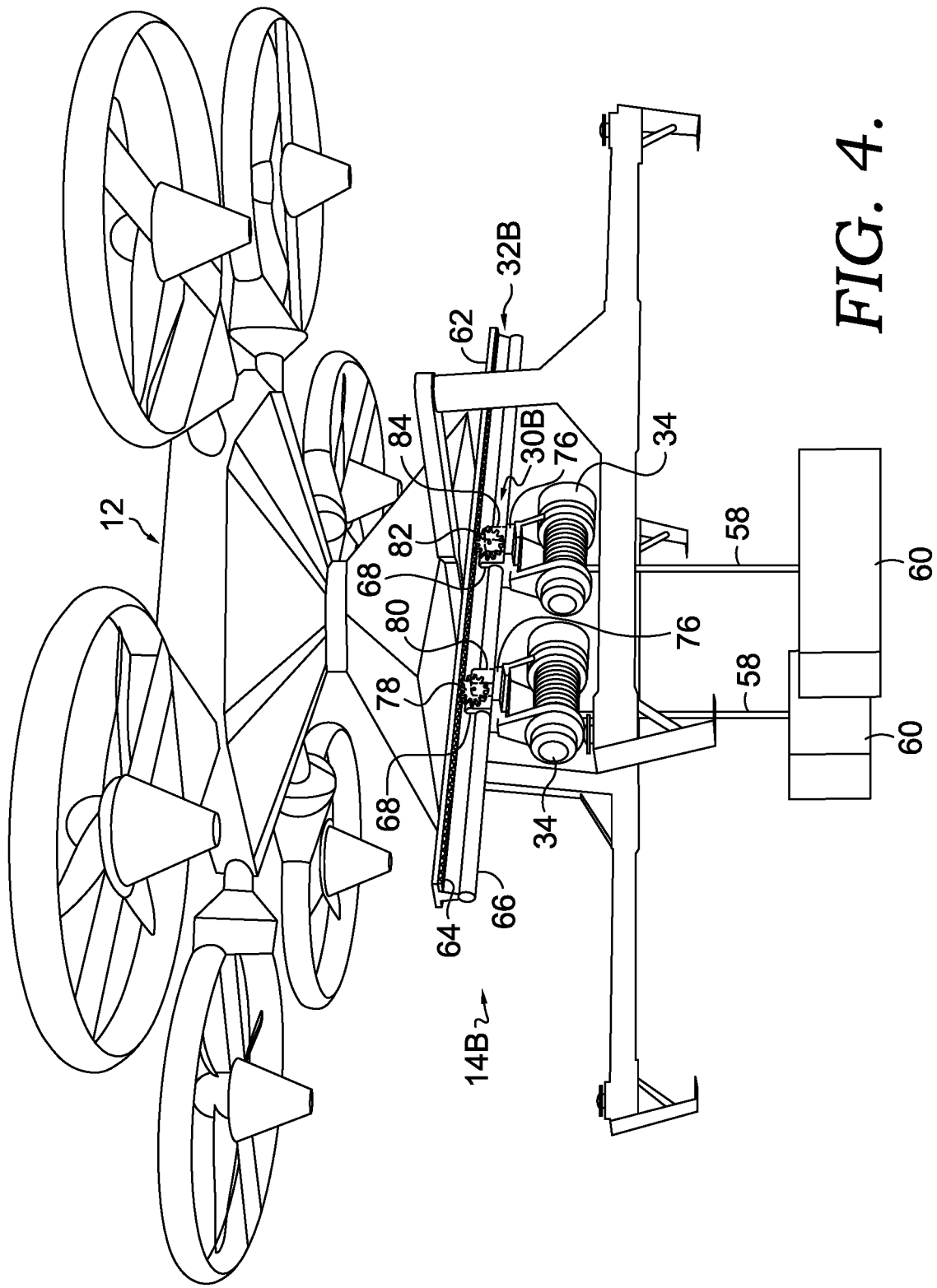
FIG. 4 is a perspective view of a parcel delivery system associated with a UAV, in accordance with another aspect described herein.

Yet another aspect of the parcel delivery system 14B is shown in FIG. 4, shown coupled to the UAV 12. The parcel delivery system 14B shown in FIG. 4 is similar in many ways to the parcel delivery system 14A shown in FIG. 3. The parcel delivery system 14B has a drive system 30B coupled to a rail system 32B. The rail system 32B is also coupled to two parcel carriers 34. Each parcel carrier 34 is adapted to transport a cargo 60 and may spool and unspool a cable 58 as described above with respect to FIGS. 2A-2C.

The rail system 32B includes a rail 62, a toothed rack 64 and a rod 66 that, in some aspects, are configured the same as shown and described above with respect to FIG. 3. As shown in FIG. 4, the rail system 32B also includes a pair of collars 68 that have a cylindrical bore that mates with the rod 66, such that the collars 68 are supported on the rod 66 and are allowed to slide or translate along the rod 66. Each collar 68 is coupled to a platform 76. Each collar 68 and platform 76 are independent from the other collar 68 and platform 76. The drive system 30B of the parcel delivery system 14B includes the toothed rack 64 on the rail 62. The drive system 30B also includes a first gear 78 powered by a motor 80 (shown in hidden lines), and a second gear 82 powered by a motor 84 (shown in hidden lines). In some aspects, the motor 80 is coupled to, and supported by, one platform 76 while the other motor 84 is coupled to, and supported by, the other platform 76.

The parcel delivery system 14B is shown with two parcel carriers 34 that are each coupled to a respective platform 76. Each parcel carrier 34 may transport a cargo 60. In the aspect shown in FIG. 4, each parcel carrier 34 can be moved independently from the other parcel carrier 34. As the motor 80 powers and rotates the first gear 78, the gear 78 engages the teeth of the rack 64. As the gear 78 rotates, the platform 76, the parcel carrier 34 and the respective cargo 60 can be translated relative to the UAV 12, independently of the platform 76 to which motor 84 is attached. Similarly, as the gear 82 rotates, the platform 76, the parcel carrier 34 and the respective cargo 60 can be translated relative to the UAV 12, and independently of the platform to which motor 80 is attached. In some aspects, the drive system 30B is operable to position the parcel carriers 34 on the rail 62 relative to the UAV 12, and each parcel carrier 34 can be independently positioned, such as might be desired to account for cargo 60 with different weights, to center the parcel carriers 34, or otherwise position the parcel carriers 34 along the rail 62 for efficient operation of the UAV 12.

Figure 5:
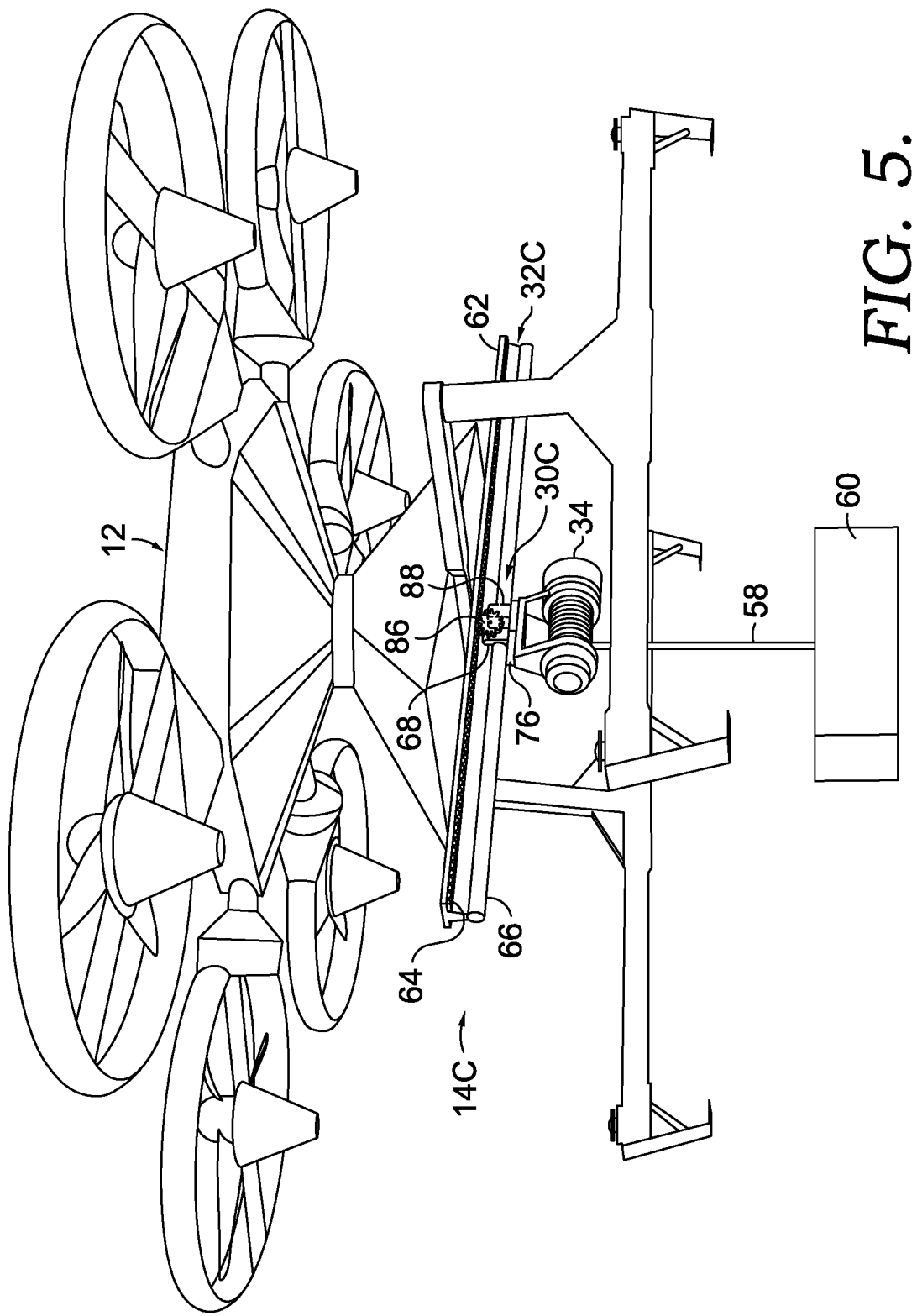
FIG. 5 is a perspective view of a parcel delivery system associated with a UAV, in accordance with another aspect described herein.

Another aspect of the parcel delivery system 14C is shown in FIG. 5, shown coupled to the UAV 12. The parcel delivery system 14C shown in FIG. 5 is similar in many ways to the parcel delivery system 14A shown and described above with respect to FIG. 3. The parcel delivery system 14C has a drive system 30C coupled to a rail system 32C. The parcel delivery system 14C varies from the parcel delivery system 14A of FIG. 3 in that only one parcel carrier 34 is included.

For the sake of completeness, the parcel delivery system 14C is further described below, with one parcel carrier 34 coupled to the UAV 12, adapted to transport a cargo 60 and spool and unspool a cable 58 as described above with respect to FIG. 2 FIGS. 2A-2C. The rail system 32C includes a rail 62, a toothed rack 64 and a rod 66 that, in some aspects, are configured the same as shown and described above with respect to FIGS. 3 and 4. As shown in FIG. 5, the rail system 32C also include a collar 68 that has a cylindrical bore that mates with the rod 66, such that the collar 68 is supported on the rod 66 and is allowed to slide or translate along the rod 66. The collar 68 is coupled to a platform 76 that, in some aspects, is the same as platform 76 of FIG. 4. The drive system 30C of the parcel delivery system 14C includes the toothed rack 64 on the rail 62. The drive system 30C also includes a gear 86 powered by a motor 88 (shown in hidden lines). In some aspects, the motor 86 is coupled to, and supported by, the platform 76. As the motor 88 powers and rotates the gear 86, the gear 86 engages the teeth of the rack

64. As the gear 86 rotates, the platform 76, the parcel carrier 34 and the respective cargo 60 can be translated relative to the UAV 12. In some aspects, the drive system 30C is operable to position the parcel carrier 34 on the rail 62 relative to the UAV 12 to center the parcel carrier 34 or otherwise position the parcel carrier 34 along the rail 62 for efficient operation of the UAV 12.

Figure 6:
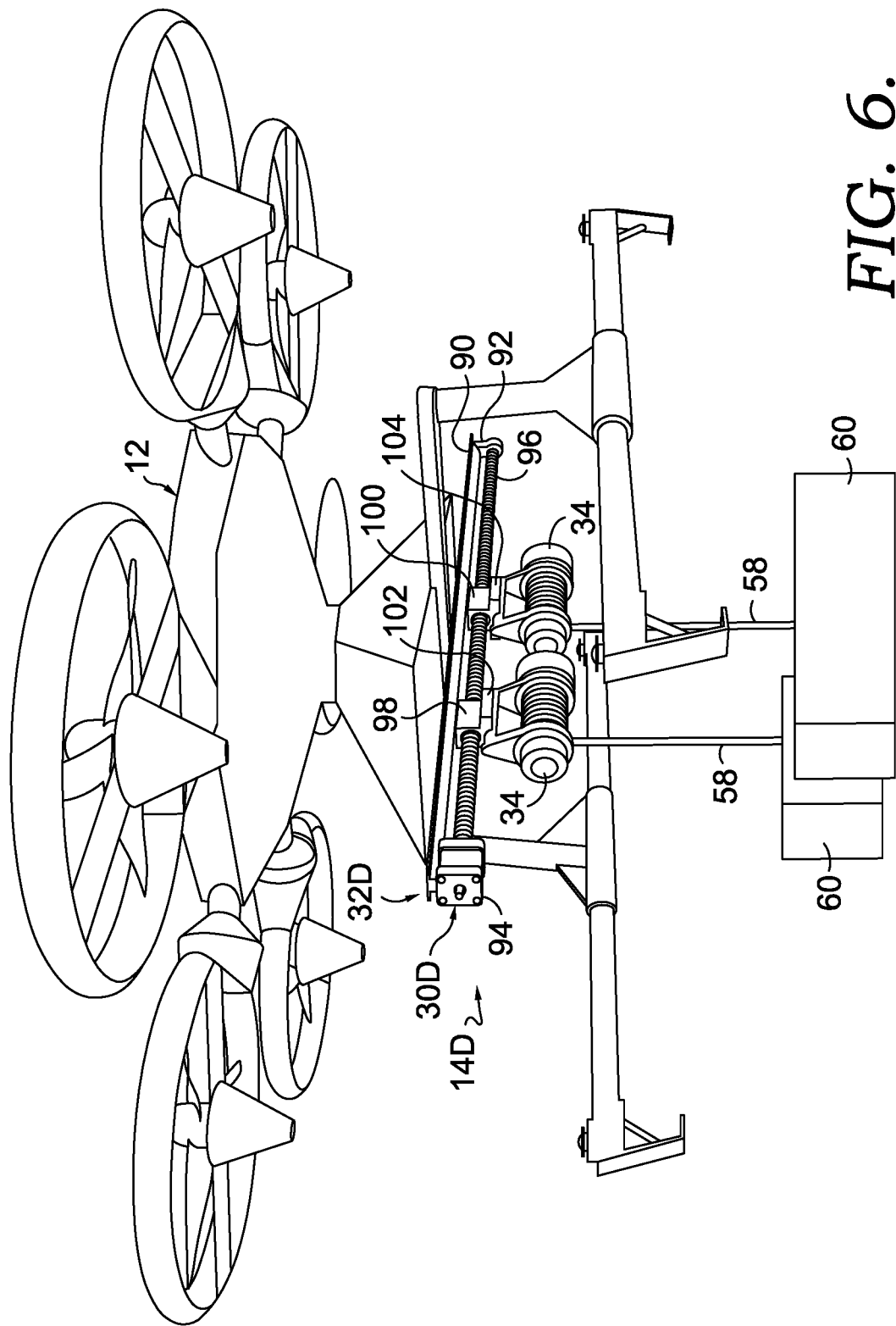
FIG. 6 is a perspective view of a parcel delivery system associated with a UAV, in accordance with another aspect described herein.

Another aspect of the parcel delivery system 14D is shown in FIG. 6, shown coupled to the UAV 12. The parcel delivery system 14D shown in FIG. 6 has a drive system 30D coupled to a rail system 32D. The rail system 32D is also coupled to two parcel carriers 34. Each parcel carrier 34 is adapted to transport a cargo 60 and may spool and unspool a cable 58 as described above with respect to FIGS. 2A-2C.

The rail system 32D includes a rail 90 that, in some aspects, is a thin, sturdy plate. The rail 90, in some aspects, has an end bracket 92 coupled to one end thereof. A motor 94 is coupled to the other end of the rail 90, with the motor 94 forming a portion of the drive system 30D. The motor 94 is coupled to a threaded rod 96 that extends from the motor 94 to the end bracket 92. The rail 90 thus supports the motor 94, and the motor 94 and the bracket 92 support the threaded rod. The end of the threaded rod 96 is able to rotate within the bracket 92, and may be coupled to a bearing within the bracket 92. In some aspects, the motor 94 is a stepper motor, but other motors are contemplated by, and within the scope of, this disclosure.

The rail system 32D also includes a first collar 98 that has a threaded cylindrical bore. The first collar 98 is supported on the threaded rod 96 as the threaded rod 96 is threaded through the cylindrical bore of the first collar 98. The rail system 32D further includes a first platform 102, to which a parcel carrier 34 is coupled. In some aspects, the first collar 98 and the first platform 102 are integrally formed as one piece, but they may also be formed as separate components and coupled together. Similarly, rail system 32D also includes a second collar 100 that has a threaded cylindrical bore. The second collar 100 is also supported on the threaded rod 96 as the threaded rod 96 is threaded through the cylindrical bore of the second collar 100 and spaced from the first collar 98. The rail system 32D further includes a second platform 104, to which another parcel carrier 34 is coupled. In some aspects, the second collar 100 and the second platform 104 are integrally formed as one piece, but they may also be formed as separate components and coupled together. In some aspects, the on-board computing device 18 may instruct the motor 94 to rotate the threaded rod 96. As the threaded rod 96 rotates, the first collar 98 and the second collar 100 will travel along the threaded rod 96, translating one way, or another, based on the directional rotation of the rod 96 imparted by the motor 94. In some aspects, the drive system 30D is operable to position the parcel carriers 34 relative to the UAV 12, such as might be desired to center the parcel carriers 34, or otherwise position the parcel carriers 34 for efficient operation of the UAV 12, and may be controlled, in some aspects, by the on-board computing device 18 on the UAV 12.

Figure 7:
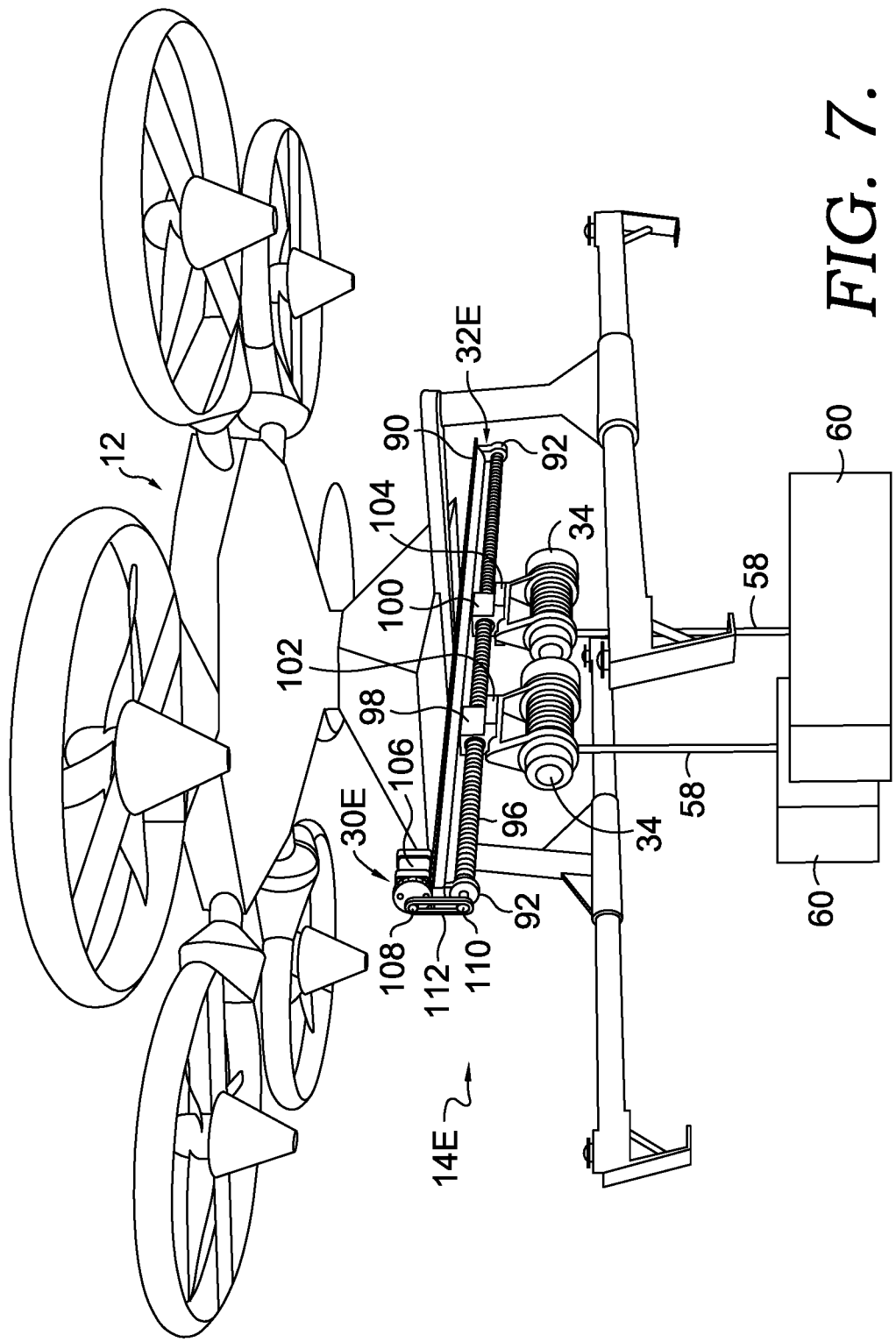
FIG. 7 is a perspective view of a parcel delivery system associated with a UAV, in accordance with another aspect described herein.

Another aspect of the parcel delivery system 14E is shown in FIG. 7, shown coupled to the UAV 12. The parcel delivery system 14E shown in FIG. 7 has a drive system 30E coupled to a rail system 32E. The rail system 32E is also coupled to two parcel carriers 34. Each parcel carrier 34 is adapted to transport a cargo 60 and may spool and unspool a cable 58 as described above with respect to FIGS. 2A-2C.

The rail system 32E is somewhat similar to the rail system 32D described above with reference to FIG. 6. In some aspects, the rail system 32E includes the rail 90 that, in some aspects, is a thin, sturdy plate. The rail 90, in some aspects, has an end bracket 92 coupled to each end thereof. The brackets 92 support the threaded rod 96 on each end thereof. In some aspects, each end bracket 92 includes a bearing that rotatingly supports the threaded rod. Like the rail system 32D, the rail system 32E also includes a first collar 98 that has a threaded cylindrical bore. The first collar 98 is supported on the threaded rod 96 as the threaded rod 96 is threaded through the cylindrical bore of the first collar 98. The rail system 32E further includes a first platform 102, to which a parcel carrier 34 is coupled. In some aspects, the first collar 98 and the first platform 102 are integrally formed as one piece, but they may also be formed as separate components and coupled together. Similarly, rail system 32E also includes a second collar 100 that has a threaded cylindrical bore. The second collar 100 is also supported on the threaded rod 96 as the threaded rod 96 is threaded through the cylindrical bore of the second collar 100 and spaced from the first collar 98. The rail system 32E further includes a second platform 104, to which another parcel carrier 34 is coupled. In some aspects, the second collar 100 and the second platform 104 are integrally formed as one piece, but they may also be formed as separate components and coupled together.

The drive system 30E includes a motor 106 that, in some aspects, is coupled to the top of rail 90 proximate one end of the threaded rod 96. The output shaft of the motor 106 is coupled to a first gear 108 that rotates under power of the motor 106 and in the direction of the output shaft of the motor 106. In some aspects, a second gear 110 is fixedly coupled to the end of the threaded rod 96 that is proximate the motor 106. The second gear 110 is coupled to the first gear 108 with a drive chain 112. The drive chain 112 could also be a drive belt or other drive operably coupling the first gear 108 to the second gear 110. In some aspects, the on-board computing device 18 may instruct the motor 106 to rotate the first gear 108, thus rotating the second gear 110 and threaded rod 96. As the threaded rod 96 rotates, the first collar 98 and the second collar 100 will travel along the threaded rod 96, translating one way, or another, based on the directional rotation of the rod 96 imparted by the motor 106. In some aspects, the drive system 30E is operable to position the parcel carriers 34 relative to the UAV 12, such as might be desired to center the parcel carriers 34, or otherwise position the parcel carriers 34 for efficient operation of the UAV 12, and may be controlled, in some aspects, by the on-board computing device 18 on the UAV 12.

Figure 8:
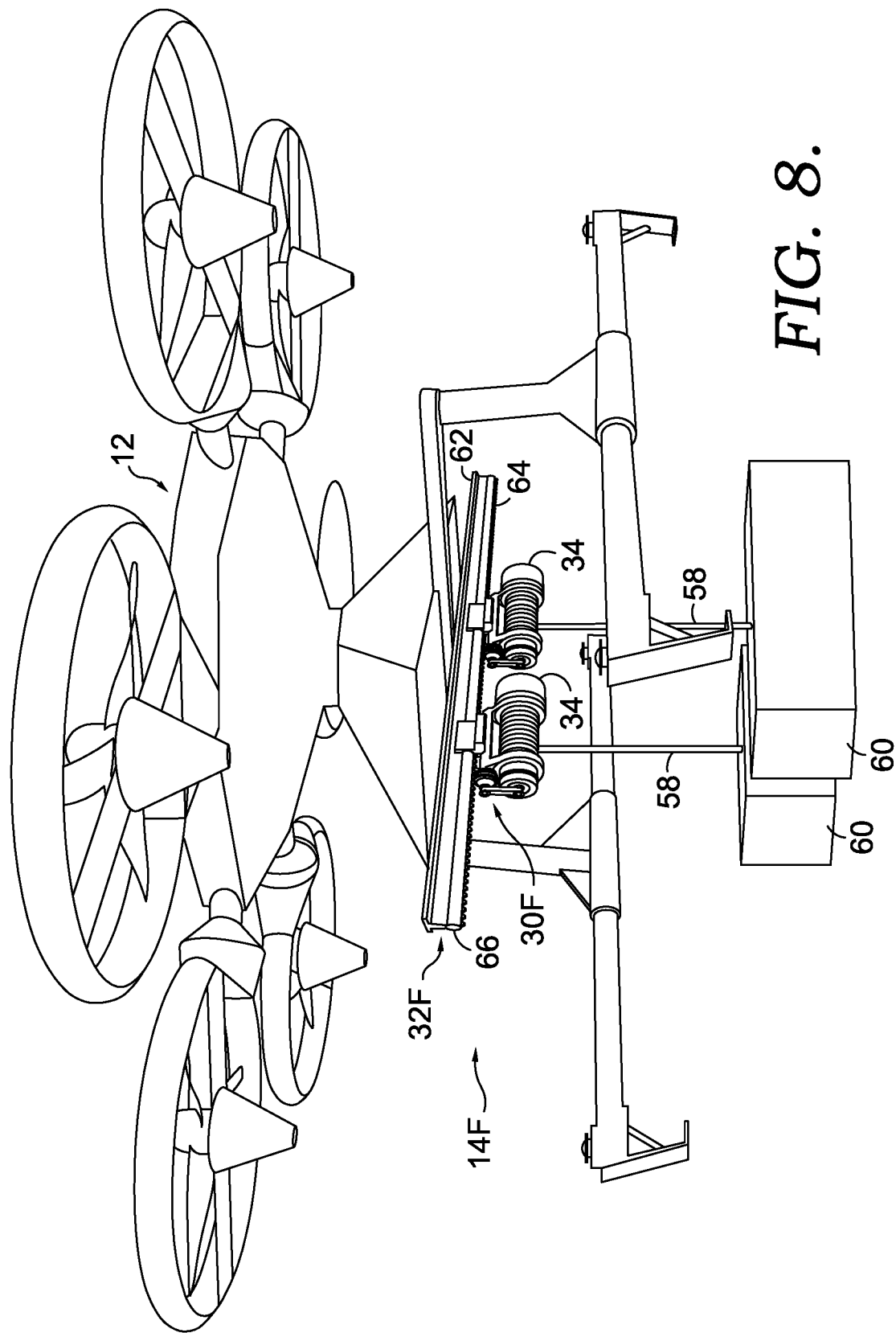
FIG. 8 is a perspective view of a parcel delivery system associated with a UAV, in accordance with another aspect described herein.
Figure 9:
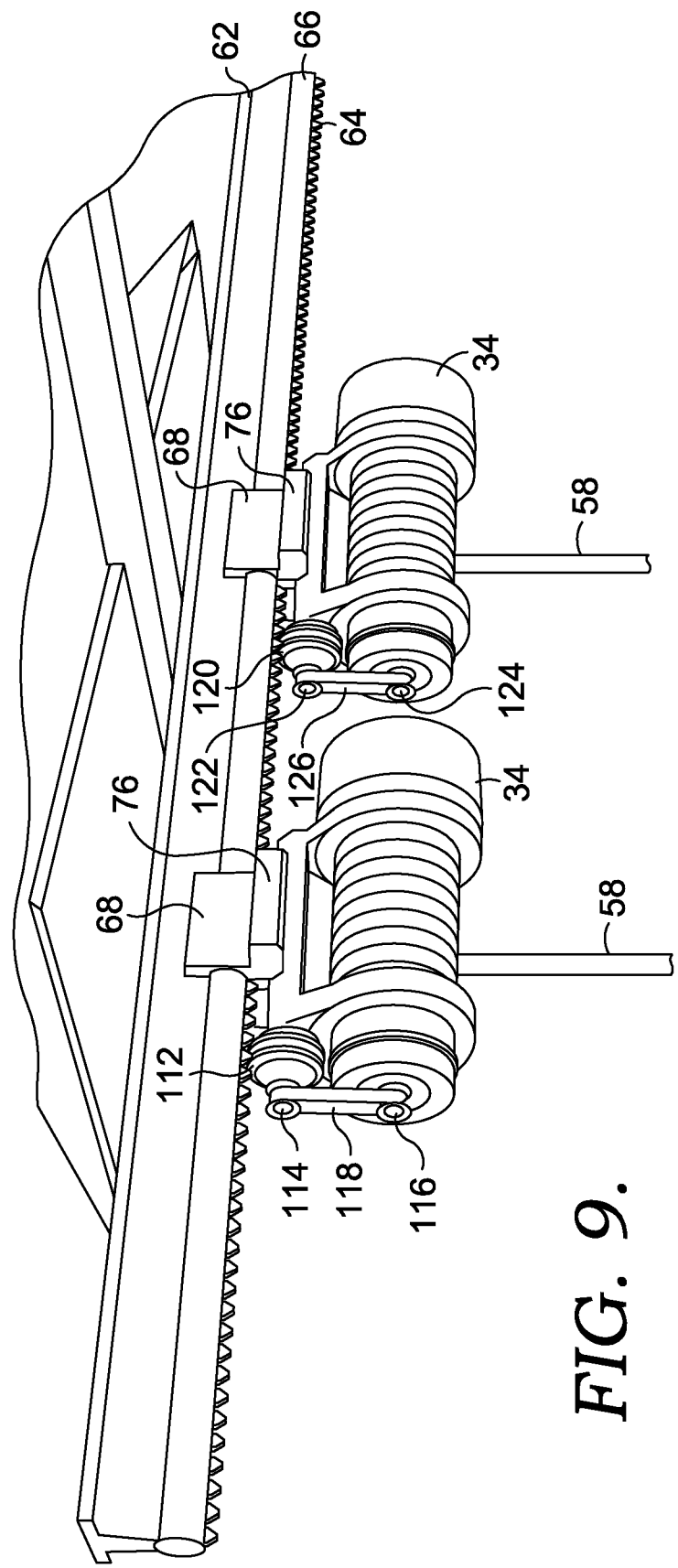
FIG. 9 is an enlarged portion showing details of construction of aspects of FIG. 8.

Yet another aspect of the parcel delivery system 14F is shown in FIGS. 8 and 9, shown coupled to the UAV 12. The parcel delivery system 14F shown in FIGS. 8 and 9 is similar in many ways to the parcel delivery system 14B shown in FIG. 4. The parcel delivery system 14F has a drive system 30F coupled to a rail system 32F. The rail system 32F is also coupled to two parcel carriers 34. Each parcel carrier 34 is adapted to transport a cargo 60 and may spool and unspool a cable 58 as described above with respect to FIGS. 2A-2C.

The rail system 32F includes a rail 62 that, in some aspects, has a general T-shape. The rail 62 may be directly coupled to the underside of the UAV 12 with any of a number of coupling mechanisms to securely affix the rail 62 to the UAV 12. A cylindrical rod 66 may be fixedly coupled to the bottom of the rail 62, such as by welding. In other aspects, the rod 66 may be integrally formed with the rail 62. In some aspects, at least one portion of the rod 66 includes an elongated, toothed rack 64, shown along the bottom of the rod 66. As best shown in FIG. 9, the rail system 32F also includes a pair of collars 68 that have a cylindrical bore that mates with the rod 66, and may have a slot to allow clearance for the toothed rack 64, such that the collars 68 are supported on the rod 66 and are allowed to slide or translate along the rod 66. Each collar 68 is coupled to a platform 76 that is also coupled to a parcel carrier 34.

The drive system 30F of the parcel delivery system 14F includes the toothed rack 64 on the rod 66. The drive system 30F also includes a first worm gear 112 that is rotatingly coupled to a portion of a respective parcel carrier 34 or to a respective platform 76. The first worm gear 112 mates with the teeth of the toothed rack 64 on the rod 66. In some aspects, the first worm gear 112 includes a shaft having a first gear or pulley 114 mounted thereto. The first gear 114 is driven by a second gear or pulley 116 extending from the respective parcel carrier 34 through a chain or belt 118. In some aspects, a common shaft of the motor for parcel carrier 34 selectively drives either the second gear 116, or spools and unspools the cable 58. In some aspects, the selective drive of either the second gear 116 or the spool of the parcel carrier 34 utilizes a concentric axle that is driven by motor of the parcel carrier 34. In other aspects, a solenoid clutch may be used to selectively drive either the second gear 116 or the spool of the parcel carrier 34. Similarly, the drive system 30F also includes a second worm gear 120 that is rotatingly coupled to a portion of a respective parcel carrier 34 or to a respective platform 76. The second worm gear 120 mates with the teeth of the toothed rack 64 on the rod 66. In some aspects, the second worm gear 120 includes a shaft having a third gear or pulley 122 mounted thereto. The third gear 122 is driven by a fourth gear or pulley 124 extending from the respective parcel carrier 34 through a chain or belt 126. The fourth gear 124 is selectively driven using a similar arrangement as that described above with respect to the second gear 116.

Each parcel carrier 34 may transport a cargo 60. In the aspect shown in FIGS. 8 and 9, each parcel carrier 34 can be moved independently from the other parcel carrier 34. As the parcel carrier 34 powers and rotates the second gear 116, the first gear 114 also rotates, which in turn rotates the first worm gear 112. As the first worm gear 112 rotates, it effects travel along the rack 64 on the rod 66. This translates the parcel carrier 34 and the respective cargo 60 relative to the UAV 12, independently of the other parcel carrier 34. Similarly, as the other parcel carrier 34 powers and rotates the fourth gear 124, the third gear 122 also rotates, which in turn rotates the second worm gear 120. As the second worm gear 120 rotates, it effects travel along the rack 64 on the rod 66. This translates the parcel carrier 34 and the respective cargo 60 relative to the UAV 12, independently of the other parcel carrier 34. In some aspects, the drive system 30F is operable to position the parcel carriers 34 on the rail 62 and rod 66 relative to the UAV 12, and each parcel carrier 34 can be independently positioned, such as might be desired to account for cargo 60 with different weights, to center the parcel carriers 34, or otherwise position the parcel carriers 34 along the rail 62 for efficient operation of the UAV 12.

In each of the aspects discussed above with respect to FIGS. 2A-9, the parcel delivery system 14 is operable to translate the parcel carrier(s) 34 along the rail system 32, powered by the drive system 30. In some aspects, only one parcel carrier 34 is used. In other aspects, two parcel carriers 34 are used that are moved together. In still other aspects, two parcel carriers 34 are used that may be moved independently from one another. While the figures depict only two parcel carriers 34, in some aspects, more than two parcel carriers could be used and coupled to the rail system 32 and moved by the drive system 30. In other words, the rail system 32 is operable using any number of parcel carriers 34 carrying various cargo and/or parcels. As one further example, a multiple hoist delivery system using a dual winch UAV may be used, such as that disclosed in U.S. patent application Ser. No. 17/108,613, filed Dec. 1, 2020 and titled Multiple Hoist Delivery System for Delivering Parcels Using Unmanned Aerial Vehicles, the disclosure of which is hereby incorporated in its entirety.

In some aspects, the parcel carriers 34 may be moved along the rail system 32 by the drive system 30 to account for a load change, such as an environment change, a flight condition change or a change in the center of gravity of the cargo 60 being transported by the UAV 12. In some aspects, this load change may be caused by a pick-up of a parcel by the UAV 12, or by a delivery of a parcel by the UAV 12. The UAV 12 (such as via the on-board computing device 18 via the network 16) or the remote server 20 may be informed of the weight of a particular parcel or cargo at the loading stage, or the weight may be captured on-board, such as by a weight sensor place on the rod 66, the parcel carrier 34 or the winch system. Additionally, the UAV 12 may be informed as to the positioning of a particular parcel within a larger cargo container, such that the position of a parcel being delivered is known. With this information, a change in the center-of-gravity of the UAV 12 with the cargo 60 can be determined and used to aid in repositioning the cargo 60 using any of the above-described parcel delivery systems 14. In other aspects, the center-of-gravity (or other desired cargo positioning relative to the UAV) may be determined in other ways (differential in rpm among the multiple rotors, differential in power load among the multiple rotors, or other flight data that may influence a desired location for the cargo 60 carried by the parcel carrier(s) 34).

In general, a number of parcel carriers 34, such as winches and hoists, are suitable for use with the present technology. One consideration in selecting a hoist is the weight of the hoists versus the amount of load the hoists can raise or lower. When using larger UAVs that can carry parcels over long distances and have greater payload capacity, relatively heavier hoists may be selected for use. This provides the advantage of being able to raise and lower heavier parcels. Alternatively, where smaller UAVs are utilized for shorter delivery distances and that have lower payload capacities, relatively smaller hoists may be selected for use. This provides the advantage of weight reduction, allowing for more of the UAVs payload capacity to be dedicated to the parcel being delivered.

Some example hoists that can be used are commercial hoists, such as electric overhead hoists. These hoists are generally powered by an electric motor, which can receive a power supply from a power source associated with the UAV 12. These commercial hoists are available in various weights and have various load capacities. In some embodiments, example hoists can include a multiple tether system linked to a single motor that is able to selectively actuate each of a plurality of tether reels for raising and lower the lines. For example, a winch with a single motor and a gearbox type mechanism can engage several tether reels lined up on a shared axle, lowering or reeling up each of the lines independently. The traction on each reel can be accomplished with an in-hub system, similar to those used on some bicycles, thus reducing the need to have more than one motor and resulting in a reduction in weight for the hoists. However, other hoists can be used without departing from the scope of the technology described herein.

Since weight is generally a consideration in the selection of hoists, another suitable device that can be used is an electric filament reel. Commercial monofilaments are available that can bear heavy loads, yet are lightweight. Among others, some examples include nylon, polyvinylidene fluoride (PVDF), polyethylene, polyethylene terephthalate (PET), and ultra-high-molecular-weight polyethylene (UHMWPE). Other biodegradable-type filaments can be selected for environmentally friendly and safe delivery. It should be understood, that unless expressly stated otherwise, the parcel carriers 34 include "winch," "hoist" and "electric reel" and within this disclosure these terms are synonymous. In other aspects, parcel carriers 34 could also include a simple claw, or other grabbing or hooking mechanism that does not involve any winch, reel or hoist system. This would be connected to the rail system 32 in the same manner as the winch. The claw could reach around a parcel (such as cargo 60) to securely hold it in place during flight and could open and close to pick-up or deliver a parcel. Additionally, a hooking or grabbing mechanism could be used to grab on to an attachment of the parcel, such as a ring or other similar device adhered to the exterior of the parcel. The claw, grabbing or hooking mechanism could release the parcel at the delivery site. This would allow for the freefall delivery of a parcel (likely from a short altitude) onto a delivery platform or location. This could be useful for rooftop delivery or in other scenarios where a winch and tether system is not necessary to safely deliver a parcel without landing. This delivery method would reduce hover time of the UAV and therefore likely reduce battery consumption since there would not be a need to spool and unspool a line. It could also allow for the release of a parcel that is being delivered by parachute from a higher altitude.

Reels configured to utilize filament-type line are generally lighter in weight. Electric motors operable with such reels are available having different torque specifications. Similar to commercial hoists, the electric motors having greater torque typically have a relatively greater weight and size. The load that can be handled using an electric motor and reel combination (also referred to as an "electric reel") directly relates to the torque capacity of the motor. Thus, there can be a tradeoff between the torque specifications of an electric motor operating a reel. In this way, for UAVs designed to carry lighter loads, a relatively smaller and lighter weight electric motor and reel combination can be selected.

To provide some non-exclusive examples, an electric motor and reel combination can be selected having a torque capacity of up to 5 lbs, up to 10 lbs, up to 15 lbs, up to 20 lbs, and so forth. Any of these may be used in conjunction with, for example, a monofilament line having a rating of up to 5 lbs, up to 10 lbs, up to 15 lbs, up to 20 lbs, and so forth.

Figure 10:
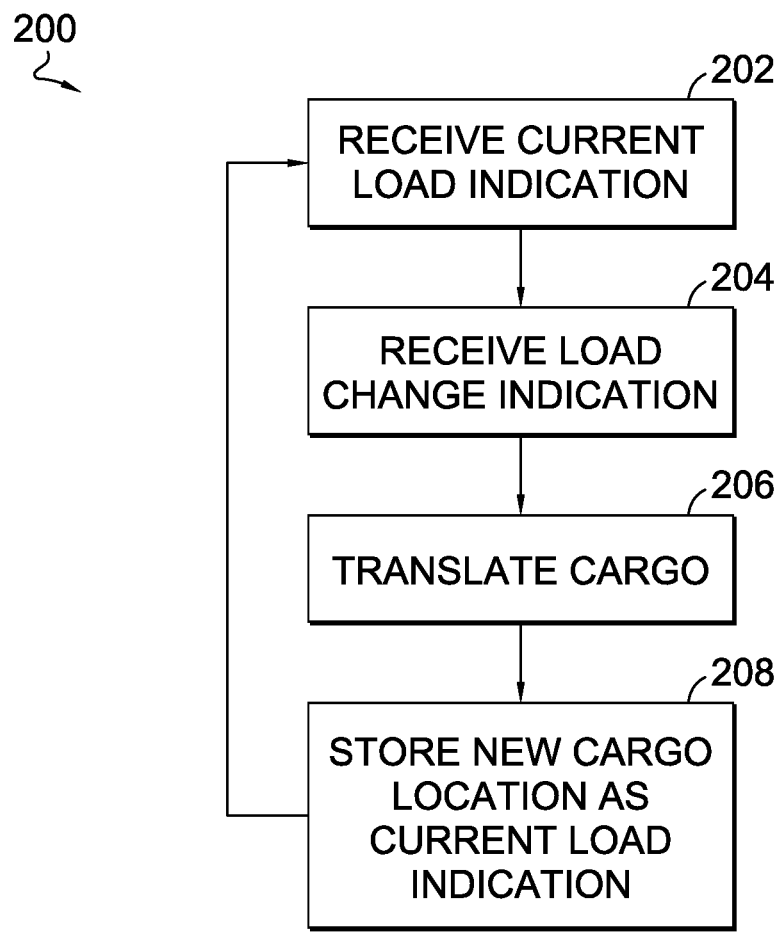
FIG. 10 depicts a method of parcel delivery, in accordance with an aspect described herein.

With reference now to FIG. 10, a block diagram for an aspect of a method 200 for delivering parcels using an unmanned aerial vehicle is shown. The method 200 includes, at block 202, receiving a current load indication associated with the UAV (such as UAV 12). The current load indication in some aspects is an indication of the center-of-gravity of the UAV 12 carrying a cargo 60. In some aspects, the current load indication is based on known weights and positions of any parcels included within the cargo 60. In other aspects, the current load indication is based on a flight condition of the UAV 12, such as the revolutions per minute of each propeller 28 of the UAV 12, or the power drawn by each of the propellers 28 of the UAV 12. In other aspects, the current load indication received in block 202 may be based upon gyroscopic data received from a gyroscope associated with the UAV 12. In still other aspects, the current load indication may be based upon flight conditions experienced by the UAV 12 (such as a forward, sideways, or backwards direction of travel, or environmental conditions experienced by the UAV such as wind speed). The current load indication may also be captured by an external device, such as a UAV base or loading area with sensors to measure the UAV weight balance once loaded. In block 204, the method 200 determines if a load change indication is received. Based upon the received load change indication, the method continues at block 206 by translating the cargo (such as cargo 60) being transported by the UAV 12. The amount and direction of translation are determined, in some aspects, by the on-board computing device 18, or from a remote flight control (such as from remote server 20, for example). In some aspects, the load change indication can be from a parcel delivery, a parcel pick-up, a change in flight conditions, or a change in other data associated with the UAV 12. The cargo translation of block 206 is carried out by the drive system 30 and rail system 32 described above with respect to FIGS. 2A-9 above. After the cargo has been translated in block 206, the method 200, in some aspects, stores the new cargo location (for example, the new positions of parcel carrier(s) 34 with respect to the UAV 12) as the new current load indication, as shown in block 208. The method 200 returns to block 202 to monitor for any additional load change indications.

Figure 11:
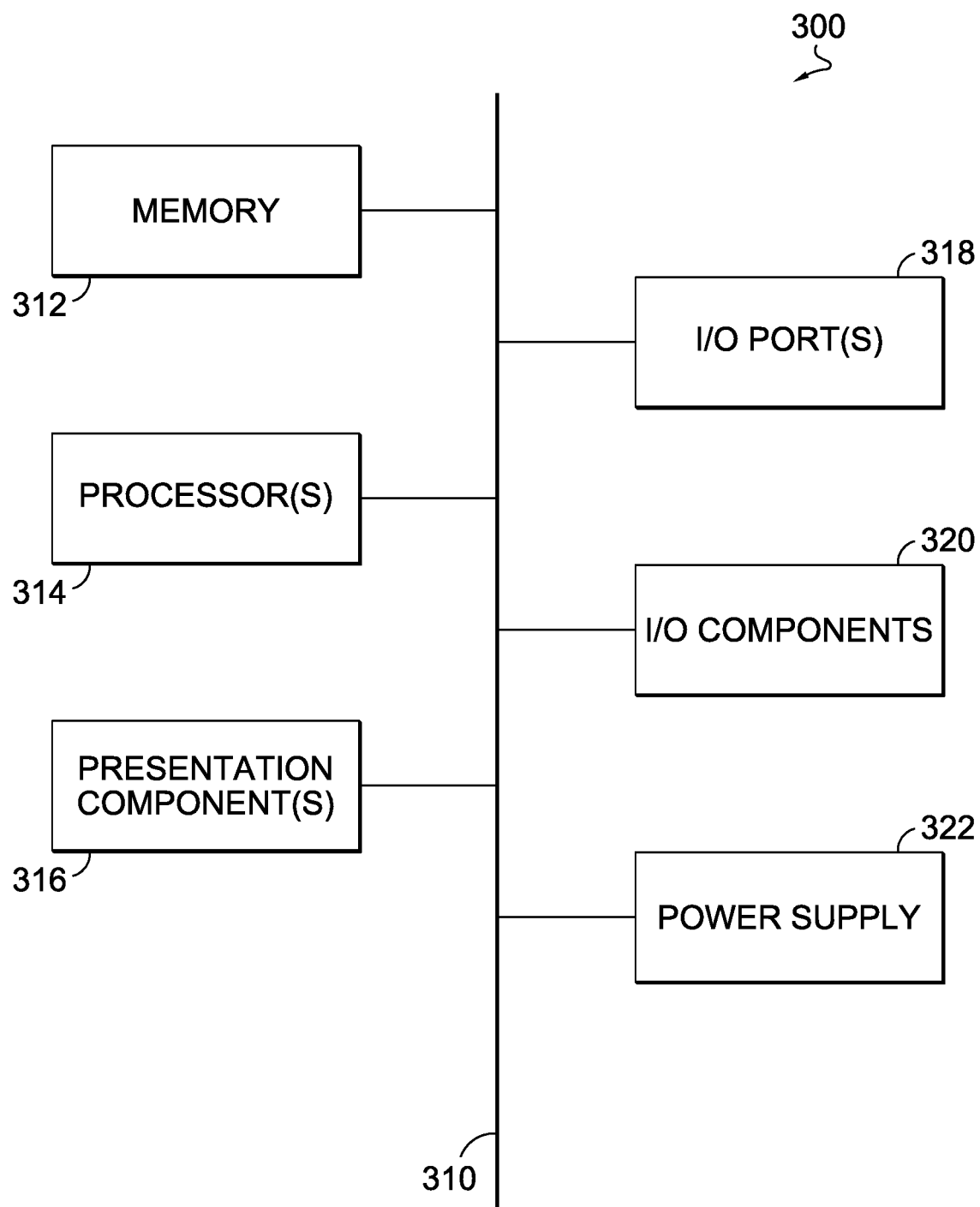
FIG. 11 is a block diagram of an example computing device suitable for use with aspects of the present technology.

With reference to FIG. 11, an example computing device 300 is provided that may be used within on-board computing device 18 and/or remote server 20, and may receive data and issue instructions associated with method 200. Computing device 300 includes bus 310 that directly or indirectly couples the following devices: memory 312, one or more processors 314, one or more presentation components 316, input/output ports 318, input/output components 320, and illustrative power supply 322. Bus 310 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 11 is merely illustrates an example computing device that can be used in connection with one or more embodiments of the present technology.

Computing device 300 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 312 includes computer storage media in the form of volatile or nonvolatile memory. The memory may be removable, non-removable, or a combination thereof. Example hardware devices include solid-state memory, hard drives, optical-disc drives, etc. Computing device 300 includes one or more processors that read data from various entities such as memory 312 or I/O components 320. Presentation component(s) 316 present data indications to a user or other device. Examples of presentation components include a display device, speaker, printing component, vibrating component, etc.

I/O ports 318 allow computing device 300 to be logically coupled to other devices including I/O components 320, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As used in this disclosure, the word "delivery" is intended to mean both "to drop off" and "to pickup," unless one of the options is impracticable. For example, a "delivery vehicle" is a vehicle capable of picking up a parcel and dropping off a parcel at a location. Words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations.

The following clauses are aspects contemplated herein.

Clause 1. A parcel delivery system associated with an unmanned aerial vehicle, the system comprising: at least a first parcel carrier adapted to transport at least a first cargo; a rail system coupling the first parcel carrier and the unmanned aerial vehicle; and a drive system coupled to the rail system and operable to translate the first parcel carrier on the rail system, moving the first parcel carrier along the rail system relative to the unmanned aerial vehicle, wherein the drive system is operable to move the first parcel carrier along the rail system to a desired position relative to the unmanned aerial vehicle.

Clause 2. The system of clause 1, wherein the first parcel carrier comprises at least a first winch having a cable coupled to the at least first cargo.

Clause 3. The system of any of clauses 1 or 2, further comprising at least a second parcel carrier adapted to transport at least a second cargo, the rail system coupling the second parcel carrier to the unmanned aerial vehicle and the drive system operable to translate the second parcel carrier on the rail system, moving the second parcel carrier along the rail system relative to the unmanned aerial vehicle, wherein the drive system is operable to move the first parcel carrier and the second parcel carrier along the rail system to desired positions relative to the unmanned aerial vehicle.

Clause 4. The system of any of clauses 1-3, wherein the second parcel carrier comprises at least a second winch having a cable coupled to the at least second cargo.

Clause 5. The system of any of clauses 1-4, wherein at least one of the at least first cargo and the at least second cargo is a container adapted to carry a plurality of parcels.

Clause 6. The system of any of clauses 1-5, wherein the rail system is coupled to the first parcel carrier and the second parcel carrier to simultaneously move the first parcel carrier and the second parcel carrier in tandem.

Clause 7. The system of any of clauses 1-6, wherein the rail system comprises: a rail coupled to the unmanned aerial vehicle; a mounting bar slidingly coupled to the rail, and coupled to the at least first parcel carrier, the mounting bar having a toothed rack; a motor-driven gear coupled to the rail and engaging the toothed rack; and a motor coupled to the motor-driven gear and operable to rotate the gear to move the mounting bar and the at least first parcel carrier relative to the rail.

Clause 8. The system of any of clauses 1-7, wherein the rail system comprises: a rail coupled to the unmanned aerial vehicle, the rail having a toothed rack; a mounting bar slidingly coupled to the rail, and coupled to the at least first parcel carrier; a motor-driven gear coupled to the mounting bar and engaging the toothed rack; and a motor coupled to the motor-driven gear and operable to rotate the gear to move the mounting bar and the at least first parcel carrier relative to the rail.

Clause 9. The system of any of clauses 1-8, wherein the rail system comprises: a threaded rail coupled to the unmanned aerial vehicle; a first mounting bar having a threaded bore, the threaded rail coupled to the mounting bar via the threaded bore, and the mounting bar coupled to the at least first parcel carrier; a motor coupled to the threaded rail, the motor operable rotate the threaded rail and move the mounting bar and the at least first parcel carrier relative to the rail.

Clause 10. The system of clauses 1-9, wherein the motor is directly coupled to the threaded rail.

Clause 11. A parcel delivery system associated with an unmanned aerial vehicle, the system comprising: at least a first parcel carrier adapted to transport at least a first cargo; at least a second parcel carrier adapted to transport at least a second cargo; a rail coupled to the unmanned aerial vehicle and having a toothed rack; a first mounting bar slidingly coupled to the rail, and coupled to the at least first parcel carrier; a second mounting bar slidingly coupled to the rail spaced from the first mounting bar, and coupled to the at least second parcel carrier; a first drive system coupling the rail, the first mounting bar and the first parcel carrier, the first drive system moving the first parcel carrier along the rail relative to the unmanned aerial vehicle; a second drive system coupling the rail, the second mounting bar and the second parcel carrier, the second drive system moving the second parcel carrier along the rail relative to the unmanned aerial vehicle, and independently from the movement of the first parcel carrier.

Clause 12. The system of clause 11, wherein the at least first parcel carrier is a first motorized winch, and wherein the at least second parcel carrier is a second motorized winch.

Clause 13. The system of any of clauses 11-12, wherein the motor of the first motorized winch is selectively operable to extend or retract a cable associated with the first motorized winch or the first drive system.

Clause 14. The system of any of clauses 11-13, wherein the motor of the second motorized winch is selectively operable to extend or retract a cable associated with the second motorized winch or the second drive system.

Clause 15. A method for parcel delivery using an unmanned aerial vehicle, comprising: receiving an current load indication of the unmanned aerial vehicle in a first loaded condition; receiving a load change indication of the unmanned aerial vehicle in a second loaded condition; translating a loaded cargo of the unmanned aerial vehicle in the second loaded condition based on the load change indication.

Clause 16. The method of clause 15, wherein the current load indication is an indication of the center-of-gravity of the unmanned aerial vehicle in the first loaded condition, and the load change indication is an indication of the center-of-gravity of the unmanned aerial vehicle in the second loaded condition.

Clause 17. The method of any of clauses 15-16, wherein the load change indication comprises receiving a changed load condition of a plurality of propellers associated with the unmanned aerial vehicle.

Clause 18. The method of any of clauses 15-17, wherein the changed load condition of the plurality of propellers comprises receiving information about at least the revolutions per minute of each of the plurality of propellers.

Clause 19. The method of any of clauses 15-18, wherein the load change indication comprises receiving a changed load condition based upon a known weight of a parcel unloaded from the unmanned aerial vehicle to arrive at the second loaded condition.

Clause 20. The method of any of clauses 15-19, wherein the load change indication comprises receiving a changed load condition based upon a known weight of a parcel loaded onto the unmanned aerial vehicle to arrive at the second loaded condition.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

The invention claimed is:

1. A parcel delivery system associated with an unmanned aerial vehicle, the parcel delivery system comprising:
   a first parcel carrier adapted to transport a first cargo;
   a rail system comprising:
      a rail coupled to the unmanned aerial vehicle and comprising a toothed rack,
      a cylindrical rod at least one of fixedly coupled to a bottom of the rail or integrally formed with the bottom of the rail, and
      a collar coupled to the first parcel carrier and comprising a cylindrical bore that mates with the cylindrical rod such that the collar is supported on the cylindrical rod and is configured to translate along the cylindrical rod; and
   a drive system comprising:
      a motor-driven gear engaging the toothed rack, and
      a motor operable to (1) rotate the motor-driven gear in a first direction relative to the unmanned aerial vehicle to have the motor-driven gear engage the toothed rack and translate the first parcel carrier in the first direction and (2) rotate the motor-driven gear in a second direction relative to the unmanned aerial vehicle to have the motor-driven gear engage the toothed rack and translate the first parcel carrier in the second direction.

2. The parcel delivery system of claim 1, wherein the first parcel carrier comprises a first winch having a cable coupled to the first cargo.

3. The parcel delivery system of claim 2, further comprising at a second parcel carrier adapted to transport a second cargo, wherein the rail system comprises a second collar that is coupled to the second parcel carrier and comprises a second cylindrical bore that mates with the cylindrical rod such that the second collar is supported on the cylindrical rod and is configured to translate along the cylindrical rod such that when the motor-driven gear is rotated in the first direction, the second parcel carrier translates in the first direction and when the motor-driven gear is rotated in the second direction, the second parcel carrier translates in the second direction.

4. The parcel delivery system of claim 3, wherein the second collar is coupled to the collar to simultaneously move the first parcel carrier and the second parcel carrier in tandem.

5. A parcel delivery system associated with an unmanned aerial vehicle, the parcel delivery system comprising:
- a first parcel carrier adapted to transport a first cargo;
- a second parcel carrier adapted to transport a second cargo;
- a rail coupled to the unmanned aerial vehicle and having a toothed rack;
- a cylindrical rod at least one of fixedly coupled to a bottom of the rail or integrally formed with the bottom of the rail;
- a first collar coupled to the first parcel carrier and comprising a first cylindrical bore that mates with the cylindrical rod such that the first collar is supported on the cylindrical rod and is configured to translate along the cylindrical rod;
- a second collar coupled to the second parcel carrier and comprising a second cylindrical bore that mates with the cylindrical rod such that the second collar is supported on the cylindrical rod and is configured to translate along the cylindrical rod;
- a first drive system comprising:
  - a first motor-driven gear engaging the toothed rack, and
  - a first motor operable to (1) rotate the first motor-driven gear in a first direction relative to the unmanned aerial vehicle to have the first motor-driven gear engage the toothed rack and translate the first parcel carrier in the first direction and (2) rotate the first motor-driven gear in a second direction relative to the unmanned aerial vehicle to have the first motor-driven gear engage the toothed rack and translate the first parcel carrier in the second direction; and
- a second drive system comprising:
  - a second motor-driven gear engaging the toothed rack, and
  - a second motor operable to (1) rotate the second motor-driven gear in the first direction to have the second motor-driven gear engage the toothed rack and translate the second parcel carrier in the first direction independently of the first parcel carrier and (2) rotate the second motor-driven gear in the second direction to have the second motor-driven gear engage the toothed rack and translate the second parcel carrier in the second direction independently of the second parcel carrier.

6. The parcel delivery system of claim 5, wherein the first parcel carrier is a first motorized winch, and the second parcel carrier is a second motorized winch.

7. The parcel delivery system of claim 6, wherein a first motor of the first motorized winch is selectively operable to extend or retract a first cable associated with the first motorized winch.

8. The parcel delivery system of claim 7, wherein a second motor of the second motorized winch is selectively operable to extend or retract a second cable associated with the second motorized winch.

* * * * *